T. G. HALL.
Cutting-Nipper.
No. 209,677.   Patented Nov. 5, 1878.
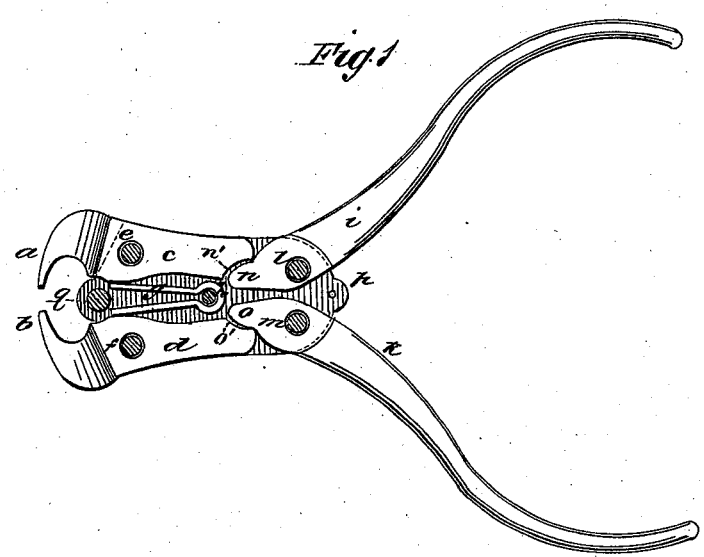
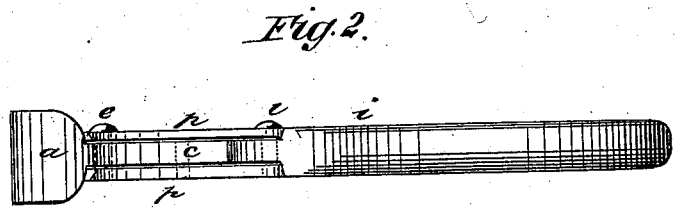
WITNESSES:          INVENTOR:
Francis McArdle      T. G. Hall
C. Sedgwick       BY Munn & Co
                        ATTORNEYS.

UNITED STATES PATENT OFFICE.

THOMAS G. HALL, OF NEW YORK, N. Y.

IMPROVEMENT IN CUTTING-NIPPERS.

Specification forming part of Letters Patent No. 209,677, dated November 5, 1878; application filed August 30, 1878.

*To all whom it may concern:*

Be it known that I, THOMAS G. HALL, of the city, county, and State of New York, have invented a new and useful Improvement in Nippers, of which the following is a specification:

In Letters Patent No. 64,664, granted to me May 14, 1867, a pair of nippers is shown in which the movable cutting-jaw is at the end of a lever that is operated upon by a pivoted handle, whereby great power is obtained upon the cutting-edges.

The object of my present invention is to furnish nippers that have great cutting power, and to lessen the expense of their manufacture.

The invention will first be described in connection with the drawing, and then pointed out in the claim.

In the accompanying drawing, Figure 1 is a side view of my improved nippers with one of the side plates removed. Fig. 2 is an edge view of the nippers.

Similar letters of reference indicate corresponding parts.

$a\,b$ are the jaws of the nippers, formed with cutting-edges, as usual. The jaws $a\,b$ are each at the outer end of levers $c\,d$, respectively.

$e$ is the fulcrum-pin of lever $c$, and $f$ is the fulcrum-pin of lever $d$. The jaws are opened by a two-armed spring, $g$, held by a pin, $h$, between the levers.

$i\,k$ are the handles, that are hung upon fulcrum-pins $l\,m$, respectively, so that the handles act as levers. The inner end of handle $i$ is formed as a toe, $n$, that acts upon the lever $c$, and the handle $k$ is formed with a toe, $o$, that acts upon the lever $d$. The toes $n\,o$ of the levers $i\,k$ work in cavities $n'\,o'$ of the levers $c\,d$, thus throwing the jaws $a\,b$ apart until the stop-pin $q$ is reached. These parts are sustained by the side plates, $p\,p$. The fulcrums $e\,f$ of the levers $c\,d$ and fulcrums $l\,m$ of the handles $i\,k$ are screw-pins, that are entered through holes in one plate, $p$, and screw into holes in the plate $p$ at the opposite side. The parts are thus securely held together.

$q$ is a pin, held by the plates $p$ between the outer end of the levers $c\,d$, in such position that the jaws or levers will bear against the said pin $q$ just before the cutting-edges come into contact, to prevent injury to the edges by contact or overlapping.

The nippers are operated by pressing the handles $i\,k$ toward each other. Each jaw $a\,b$ is acted upon by compound leverage, and the pressure upon any article placed between the cutting-faces is augmented by the dual construction of the parts. The parts of the nippers are compact and strong, and not likely to break by any pressure that can be applied by hand. The nippers are easily put together or taken apart for repairs, and the parts are of such shape that the lever-jaws are interchangeable, as are also the handles.

Having thus fully described my invention, I claim as new and desire to secure by Letters Patent—

The combination, with the levers $c\,d$ and plates $p$, of the pin $q$, arranged between said levers, and in front of their fulcrums, as and for the purpose specified.

THOMAS G. HALL.

Witnesses:
C. SEDGWICK,
GEO. D. WALKER.